United States Patent [19]

Dexter et al.

[11] Patent Number: 4,789,278
[45] Date of Patent: Dec. 6, 1988

[54] PLANETARY MILLING MACHINE

[75] Inventors: William R. Dexter, Washington; Eberhard E. Wasserbaech, Utica, both of Mich.

[73] Assignee: General Motors Corporation, Detroit, Mich.

[21] Appl. No.: 107,771

[22] Filed: Oct. 13, 1987

[51] Int. Cl.⁴ .............................................. B23C 1/12
[52] U.S. Cl. .................................................... 409/200
[58] Field of Search .............. 409/190, 199, 200, 201, 409/211, 216, 231; 51/43, 90; 279/6

[56] References Cited

U.S. PATENT DOCUMENTS 4,423,991  1/1984  Derr, Jr. .............................. 409/200

Primary Examiner—Neil Abrams
Attorney, Agent, or Firm—Dean L. Ellis

[57] ABSTRACT

A planetary milling machine employs concentric inner drive tubes within a housing, eccentric cam means on one such tube and a motorized spindle unit in an orbitally adapted carrier in the housing which has cam follower means inter engaged with the cam means such that with both tubes constantly rotating and with one tube driving the carrier, a speed differential between the two tubes can be employed to establish the desired orbital relation of the spindle unit to a central working axis of the machine.

3 Claims, 3 Drawing Sheets

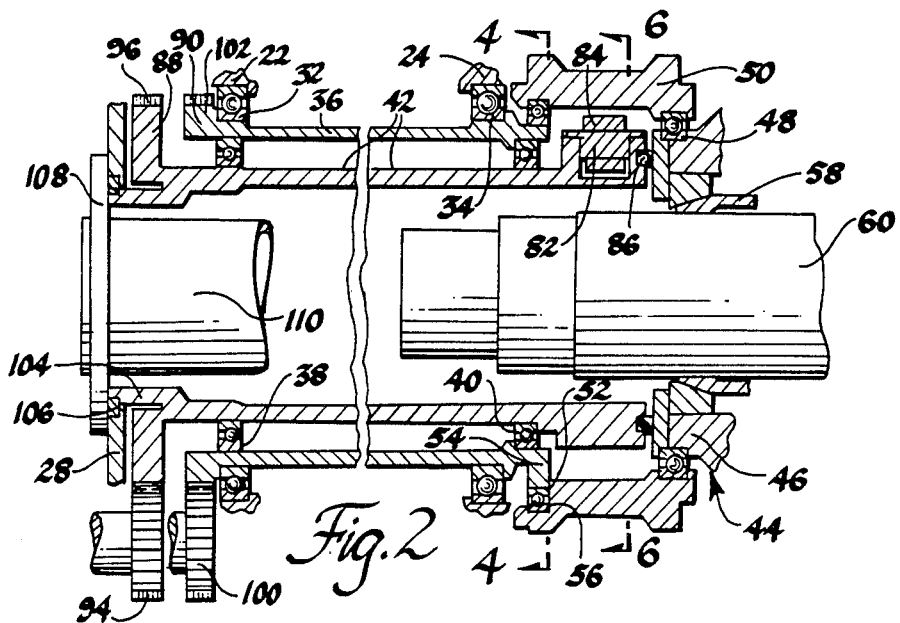
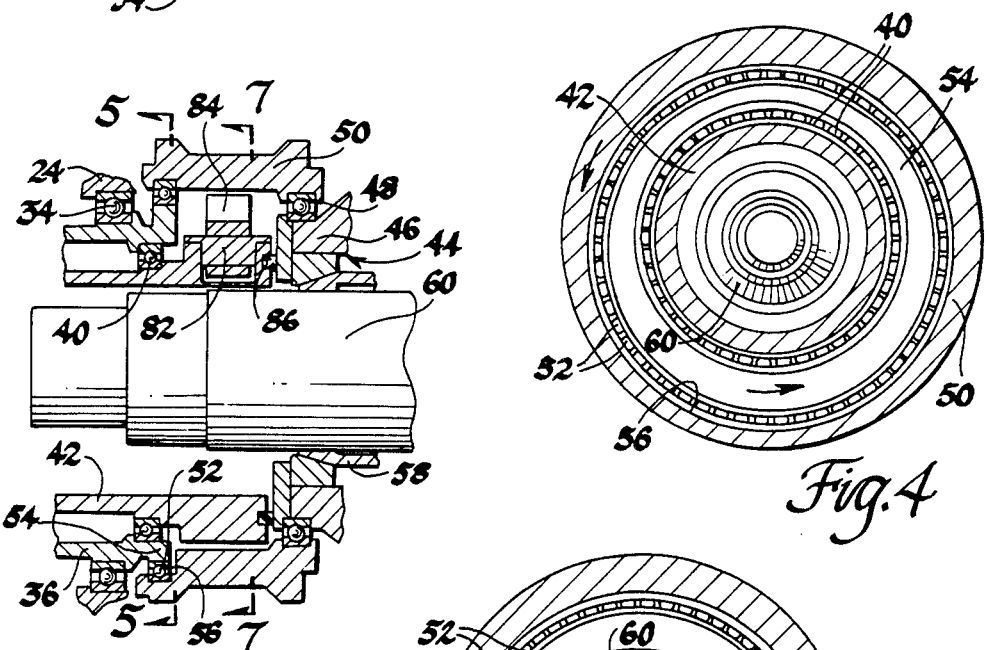
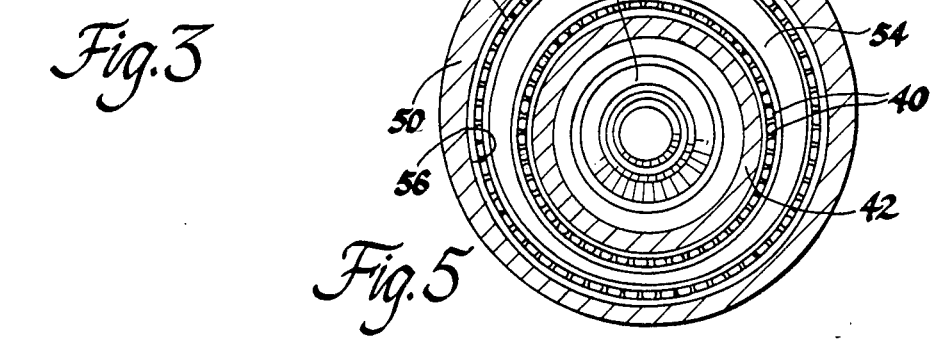

PLANETARY MILLING MACHINE

The invention relates to machine tools and more particularly to milling machines of the variety referred to as "planetary" milling machines wherein the cutting tool is caused to describe a planetary or orbital path with respect to work in process fixed on a working axis of the machine.

The present invention provides improvements in planetary milling machines in respect of expanded flexibility or adaptability to complex cutting operations wherein planetary motion is one ingredient. For example, the machine of the instant invention is perfectly adapted to accomplishing recent proposals for combined drilling and thread milling of holes in work pieces in a single pass of the cutting tool. In such an operation, the cutting tool is generally in the form of a thread mill provided with a cutting tip of a diameter at least as large as an adjacent thread cutting tooth or teeth or serrations and in its cutting operation the cutting tool is first caused to penetrate the work piece along the working axis to drill the same to a desired distance, whereafter the cutting tool is displaced laterally of the hole axis to have the thread cutting teeth penetrate the hole wall to the desired maximum thread diameter, and thereafter simultaneously orbit about the hole axis and co-ordinatively axially advance or retract the thread cutting teeth in helix fashion to define threads in the hole wall.

Of course, other operations are similarly contemplated by use of the instant machine tool. Thus, in general, the machine tool is adapted to either individual or combined planetary motion of the cutting head with respect to a defined workpiece axis and axial infeed and outfeed with respect thereto. The various motions thus available to the machine tool cutting head are individually controllable and the selection of a given planetary or orbiting path of the head is likewise selectable over a large range, including perfectly axial relation with the workpiece axis.

The machine of the invention includes a main housing containing a motorized spindle unit which includes the tool holder and a high frequency, high torque electric motor for driving the latter for rotation of a cutting tool on its own axis. The housing is mounted upon a longitudinal slide or guide, adapted to movement of the housing or the cutting tool over a distance along such tool axis. For the planetary motion, some amount of planetary orbit of the spindle unit, between perfectly coaxial and some maximum orbit distance, may be selected in relation to a central reference axis of the housing. The spindle unit may orbit in its fixed eccentric relation about the central axis of the housing at a controlled orbiting speed, while the cutter tool rotates on its own axis.

An advantage of this invention is in the control of not only the orbiting speed of the spindle unit about the central reference axis but also the degree or distance of orbital relation thereto by the simple selection of the relative speeds of two subsidiary, constantly energized, electric motor units integrated with the housing. Each such controllable subsidiary motor unit is associated with a nested, concentrically related pair of drive tubes mounted rotatably within the housing.

Cam eccentric means and cam follower eccentric means are employed with the two nested drive tubes in such a way that while one drive tube having operative connection with the spindle unit causes the latter to bodily rotate, the other of the drive tubes utilizes the cam and cam follower apparatus to employ a selected differential in speeds of the two motor units driving the two tubes, for selected control of the orbit relation of the spindle unit within the housing.

Further, by use of an orbitally adapted mounting for the spindle unit incorporating, for example, orthogonally arranged guidance grooves and ball bearing elements constrained therein, the spindle unit is caused to simply mutate about the housing axis while driven by one of the drive tubes, as opposed to a continuous bodily rotation about its own axis. In this way, electrical wiring cables and similar adjustments connecting the spindle unit to electrical control apparatus on the exterior of the machine are not caused to under go twisting.

The foregoing and other features and advantages of the invention will be readily apparent from the following specification and drawings wherein FIG. 1 is a perspective view, partly in section, illustrating the machine tool according to the invention;

FIG. 2 is a vertical section of a portion of the machine tool, illustrating the parts in a non-orbiting o concentric disposition;

FIG. 3 is a view similar to FIG. 2 but showing parts in a maximum orbit disposition;

FIG. 4 is a sectional view taken generally along the plane indicated by lines 4—4 of FIG. 2;

FIG. 5 is a sectional view taken generally along the plane indicated by lines 5—5 of FIG. 3;

Figure 1:
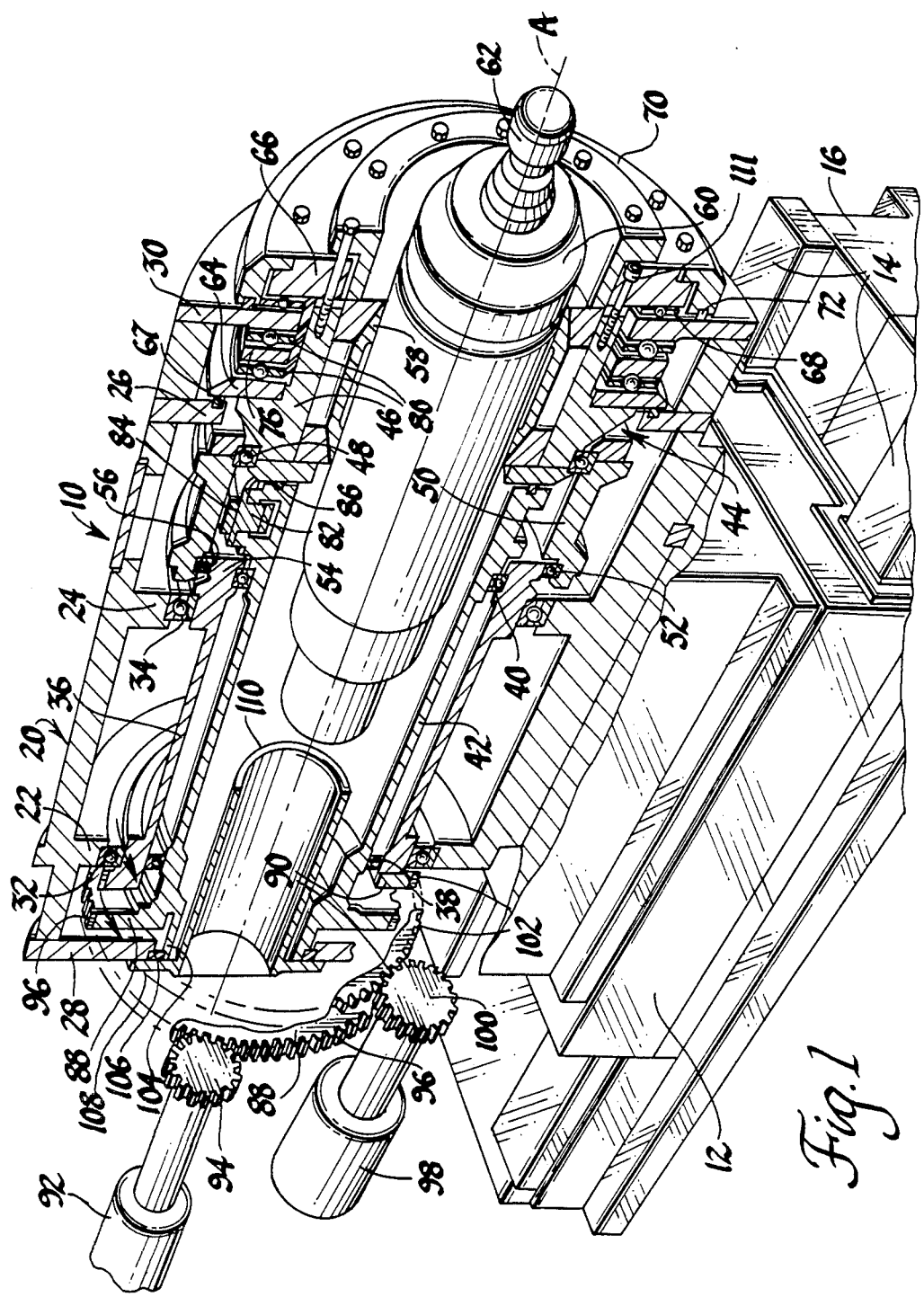

Referring now to FIG. 1 of the drawings, the machine tool generally comprises a head 10 of cylindrical character suitably fixed to a base 12 which is slidably seated upon ways 14 of a support bed 16 secured to the factory floor or otherwise. Appropriate actuating motor means may be employed as well, for precise control of the position of base 12 and the head 10 along the ways 14 in directions generally parallel with the longitudinal axis of the head. Since such actuating means are well understood in the art they will not be described in detail. The head 10 includes a housing 20 of multi-piece construction and generally of barrel or hollow character with a series of internal flanges 22, 24 and 26 projecting internally thereof, an end plate 28 at the rear end, and an end plate 30 at its forward end. Flanges 22 and 24 define seats for a pair of ball bearing assemblies 32 and 34 located concentrically of the major longitudinal axis of the tool head, labeled A.

The ball bearings 32 and 34 support an outer drive tube 36. Such outer drive tube 36 in turn at its finished inside diameter wall mounts another pair of ball bearings 38 and 40 also positioned concentrically of head axis A, and such ball bearings serve to mount an inner drive tube 42. Thus, the two drive tubes 36 and 42 are mounted for independent rotation, ultimately on housing 20 and about housing axis A.

Toward the forward end of the unit of the head 10, a spindle unit carrier assembly, generally designated 44, of ring like character includes a main ring member 46, on the rearward end of which is provided a ball bearing assembly 48. Immediately rearward of the main ring 46 there is provided an eccentric charactered drive ring 50, at the internal forward end of which the ball bearing 48 is precisely fitted. Spaced rearwardly at an internal surface of such drive ring 50, a further ball bearing assembly 52 is provided and referring also to FIGS. 4 and 5, it is seen that such ball bearing assembly 52 is in turn set upon a circular or cam end portion 54 of the outer drive tube 36, such cam being eccentrically related to the machine axis A and thereby defining an eccentric lobe. Such eccentric lobe or cam 54 and ball bearing 52 fit within a complementary cam follower circular recess 56 of drive ring 50, such recess again being eccentrically related to the remainder of such drive ring including the portion thereof seating ball bearing 48. FIG. 4 illustrates the position of the cam 54 within cam follower recess 56 in which the parts cause the drive ring 50 to assume a position aligned on the central reference axis A of housing 20. However, FIG. 5 illustrates a condition of the cam and cam follower wherein the same are relatively rotated 180° from the position of FIG. 4 to cause the drive ring to displace to a maximum orbit position out of concentric relation with the axis A.

Reverting to FIG. 1, carrier main ring 46 is provided at its internal diameter with suitable retainer structure 58 which fixes for unitary relation with such main ring the motorized tool spindle unit 60. As well understood in the art, spindle unit 60 generally comprises an electric variable speed, high frequency, high torque electric motor provided at its outer or forward end on the drive shaft with a suitable collet or chuck device, indicated at 62. Such chuck or collet conventionally holds a cutting tool or the like adapted to be rotated on its own axis by rotation of the electric motor drive shaft.

Carrier main ring 46 is further provided with a flange structure 64 projecting radially outwardly toward housing 20 and suitably sealed to flange 26 thereof by a sealing ring 67. At its extreme outer end a similar flange 66 overlies the end plate 30 of the housing in spaced relation thereto with an intervening thrust bearing 68 comprising a series of balls constrained in an annular ball retainer as is well known. A ring like retainer 70 is secured by screws against retainer 58 to clamp motorized tool spindle. Flange 66 is secured to the carrier main ring 46 and through the fitting of spacer 111. Proper preload is achieved for thrust bearing 68 between flanges 66 and 64. A further seal ring 72 is engaged between the end plate 30 and retainer 70.

Figure 8:
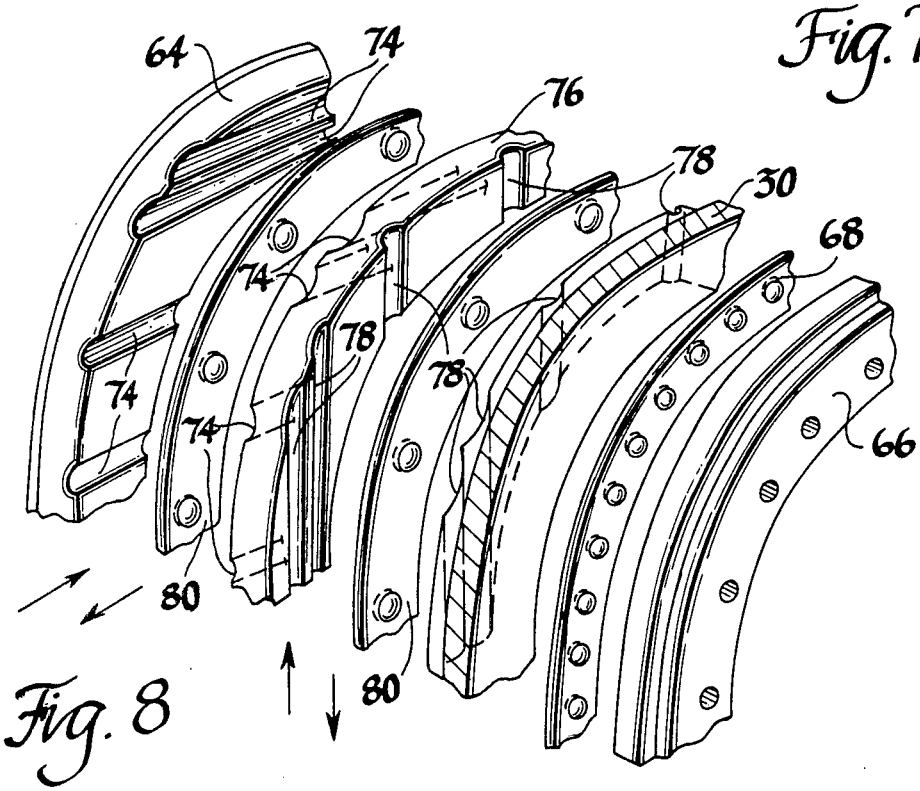
FIG. 8 is an exploded enlarged view of a portion of FIG. 1.

Referring also to FIG. 8 at the interior of end plate 30, flange 64 of main ring 46 includes a series of generally horizontal aligned parallel guidance grooves 74. An intermediate ball race member 76 of annular character is provided at its opposing face with complementary such grooves. The inner face of end plate 30 is provided with a generally vertically arranged series of parallel guidance grooves 78, and the opposing face of intermediate race 76 has a complementary set of such vertical grooves. A like pair of ball bearing assemblies 80 each having a spaced series of balls in an annular ball retainer are situated to locate the respective sets of bearing balls in the opposed grooves 74 and 78.

Figure 6:
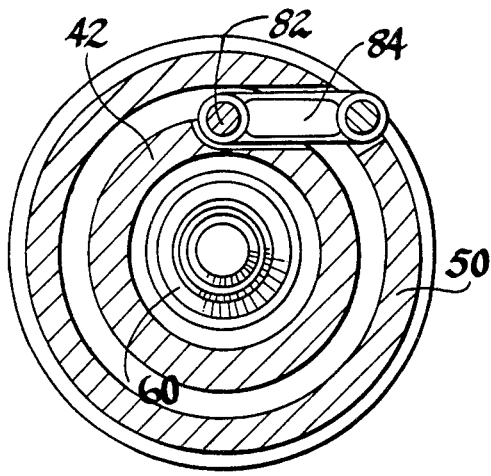
FIG. 6 is a sectional view taken generally along the plane indicated by lines 6—6 of FIG. 2.
Figure 7:
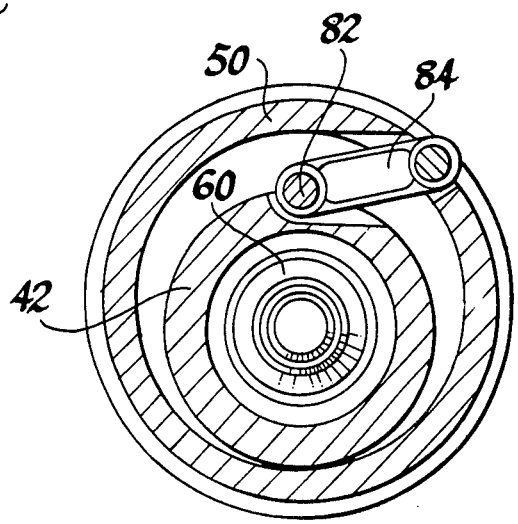
FIG. 7 is a sectional view taken generally along the plane indicated by lines 7—7 of FIG. 3.

Referring to FIG. 1 and referring also to FIGS. 6 and 7, the internal end of drive tube 42 is provided with a suitable trunnion device 82 for pivotally mounting one end of a drive link 84, the other end of which extends transversely to a similar trunnion connection with drive ring 50. A seal link 86 is provided between the terminal end face of inner tube 42 and the adjacent end of main ring 46.

At the rearward end of housing 20, and internally of its end plate 28, inner drive tube 42 is provided with an externally toothed drive flange 88, while outer drive tube 36 is provided with a similarly externally toothed drive flange 90. A first variable speed electric motor unit 92 suitably mounted to end plate 28 has a gear reduction portion provided with an output pinion 94, the latter meshed with the teeth 96 of flange 88. A second similarly mounted variable speed motor unit 98 has similar gear reduction with a drive pinion 100 meshed with the teeth 102 of flange 90.

The inner drive tube 42 at its rearward distal end has an extension 104 received in a central aperture of the end plate 28 and a wiping seal 106 closes that junction against entry of contaminants. A closure plate 108 has an annular flange secured to end plate 28 and which overlies this junction and it in turn incorporates an inwardly extending tubular portion 110 received through the end aperture to be received within the inner drive tube 42. The outer end of such tubular portion 110 is open so that it serves as a conduit which is stationary as a unit with housing 20 for passage therethrough of control cables and other electrical wire required for the motor portion of spindle unit 60.

Turning now to the operation of the machine tool, it has been pointed out above that it is adaptable to a variety of machining operations and this includes simpler operations wherein spindle unit 60 is employed with its cutting tool for conventional, non-planetary motion while penetrating a workpiece. That is, the tool may be a simple drill, reamer or mill and the spindle unit may maintain a fixed tool axis with respect to a stationary workpiece while the base 12 of the machine head 10 is controllably advanced along ways 14 for such penetration of the workpiece as a result of the energized rotation by the motor spindle 14 of its collet 62 and the tool contained therein.

To accomplish a more elaborate machining operation such as a planetary cutting operation as might be required, for example, in the manufacture of internal threads on an apertured workpiece presented to spindle unit 14, a planetary motion will now be described. Assuming that the machine head 10 has been placed along ways 14 to the appropriate position indexing the tool in a position on axis A with respect to the workpiece, the next step is to establish a selected new position for the tool axis at collet 62 which is laterally displaced from the central machine axis A. Assuming further that the spindle unit 60 with this collect is initially positioned with its axis coincident to axis A as shown in FIGS. 2, 4 and 6, the two variable speed motor units 92 and 98 are energized to cause simultaneous rotation of both outer and inner drive tube 36 and 42 at identical speeds. The actual speed of rotation of each tube may be controlled and monitored in a variety of ways but is contemplated that each drive flange 88 and 90 be provided with proximity means, each cooperating with a suitable sensor on housing 20 which may be integrated within any of the well known electrical apparatus adapted to detection and data transmission of angular velocity. With both tubes 42 and 36 rotating, at an initial identical velocity, and in the same direction, for example counterclockwise, as indicated by the two arrows in FIG. 1 adjacent the flanges 88 and 90, the further conventional electronic control apparatus utilized for control of the speed of motor units 92 and 98 is manipulated to cause a speed differential of some selected amount between these motor units whereby to advance the position of one of the tubes 36 or 42 relative to the other from that indicated in FIGS. 2, 4 and 6. For example, as outer tube 36 is increased in speed to advance relative to tube 42, the effect is to re-orient the cam lobe 54 of such outer tube some angular amount counterclockwise in FIG. 4, toward the displaced maximum re-orientation of eccentricity illustrated in FIG. 5, this all with respect to the slower-rotating cam follower recess 56 of the drive ring 50. The latter has of course been caused to rotate uniformly at that slower speed of inner drive tube 42 as a unit therewith, through the agency of the drive link 84. To the degree of time increment that such differential in speed is allowed to persist, the result is a lateral displacement from the generally concentric relationship of parts shown in FIG. 4 to some position of drive ring 50 selected within the range illustrated between FIGS. 6 and 7. In the latter figure, the drive ring 50 is shown displaced a maximum eccentric amount wherein drive link 84 is angularly displaced but still imparting unitary speed of rotation between inner drive tube 42 and such drive ring. With the desired eccentric offset of drive ring 50 accomplished a like degree of orbital offset of the entire carrier assembly 44 including main ring 46 is also effected to transversely displace the axis (including tool axis) of spindle 60 relative to machine axis A, such as illustrated in FIG. 5. It is further to be noted that by virtue of the orthogonally arranged set of guidance grooves 74 and 78 grounded in housing end plate 30, the motion imparted thusly to the main ring 46 and the spindle unit is a mutating motion as opposed to a simple angular displacement of the ring and spindle unit about their own axes. Such mutating motion, of course, requires displacement of both sets of ball bearing/retainer units both vertically and horizontally with respect to housing end plate 30 in continuous fashion.

Having established the desired degree of axial offset of spindle unit 60 outer drive tube 36 must resume in-phase speed relationship with inner drive tube 42 to maintain the offset. It is thus contemplated that the motor controls for the two motor units 92 and 98 will simply be programmed to effect an acceleration to and an immediate deceleration from a peak differential speed, both in basically linear fashion, to accomplish the spindle unit offset gradually and precisely at the end of the deceleration mode. With the offset established and the two drive tubes once again rotating at identical speed, the spindle unit is now caused to orbit about machine axis A at the established offset distance while main ring 46 is mutated along with spindle unit 60 as a result of the continued rotation of drive ring 50 in unison with inner tube 42. This orbital movement of spindle unit 60 affords the desired planetary motion of the tool axis of collet 62 at the desired offset distance from machine axis A required to perform the illustrative internal milling of the workpiece aperture inner wall.

To return the machine tool to its normal condition of parts such as illustrated in FIGS. 2 and 4, the motor controls are caused simply to reverse the former sequence, for example, by briefly retarding the speed of the outer drive tube 36 in a proper deceleration/acceleration mode readily established to precisely, at the end of the acceleration mode, return the drive ring 50 from whatever displaced condition (e.g. FIG. 7) back to the concentric relation of FIG. 6. Alternatively, the original acceleration/deceleration routine might be repeated to realign the parts to FIG. 4 relation.

It will further be understood that by the present invention other than simple planetary milling may well be established such as in the performance of thread milling as recited above. In that instance, given the established planetary offset of spindle unit 60 from machine axis A and a continuous orbital movement of the collet 62 thereabout, it is seen that a thread milling operation can be performed whereby this orbital motion is co-ordinatively combined with a translation of the machine head 10 along ways 14 to describe a helical path on any given point of the tool contained in the collet.

This is most efficacious where for threaded holes it is desired to employ a single tool of combined thread mill/drill character. In that case, with the spindle unit 60 initially in concentric relation as in FIG. 6, such tool may be simply advanced by translation of machine head 10 on ways 14 so as to drill the workpiece along machine axis A to a desired depth. Thereafter, programmed control of the two motor units 92 and 98 as above described will displace the spindle unit 60 a desired transverse amount from the axis A to cause the continuously rotating tool driven by the spindle unit to laterally penetrate the wall of the hole in which this tool resides to the distance which establishes the maximum thread diameter defined by the cutting tip of the thread mill/drill tool. Having thus established the offset distance of the tool axis and thus the thread diameter, combined orbital and translating motion of the machine tool may then be established to advance the tool helix-fashion to cut threads. The machine motor controls, at the completion of thread cutting, may then be manipulated to return the spindle unit into alignment with machine axis A and the base 12 may be actuated to withdraw the tool from the workpiece.

It will be apparent that the described operations are only a few of the variety of operations to which the instant machine is addressed. By the use of a pair of individually controllable variable speed electric motor units driving the two drive tubes 36 and 42, uniform and predictable operations are insured with relative ease given the state of electronic motor speed control now routinely available.

It will also be appreciated that a number of alternative interassociations of the principal operating components above-described may be effected to accomplish the same general functions described, all with them common feature of dual subsidiary variable speed motors for the two drive shafts or tubes 36 and 42. For example, the drive connections of the two tubes to the spindle unit carrier assembly and to the cam and cam follower combination might be reversed. Such cam and follower elements might be employed directly in association within elements of the spindle unit 60 rather than its carrier.

The embodiments of the invention in which an exclusive property or privilege is claimed are defined as follows:

1. A machine tool, comprising, housing means defining a longitudinal central axis, a motorized tool spindle unit including tool holding means defining a tool axis and electric motor means for driving the tool holding means so as to perform the cutting or other tool function of the machine, means mounting said spindle unit on said housing means for generally parallel orientation between said tool axis and said central axis and for movement of said spindle unit in transverse planes of said housing means to any of a variety of selectable positions of said tool axis parallely spaced with respect to said central axis, said mounting means being adapted to orbital movement of said spindle unit about said central axis, a first drive shaft means rotatably mounted on said housing means with its axis aligned on said central axis, first variable speed electric motor means for rotating said first shaft means on such axis, a second rotatable drive shaft means having its axis aligned on said central axis, second variable speed electric motor means for rotating said second shaft means on such axis in controlled relationship with rotation of said first drive shaft means, means connecting one of said shaft means with said mounting means for unitary rotation with respect to said housing, and cam and cam follower means on the other of said tube means and on either said mounting means or on said spindle unit inter-engaged so that upon relative rotation between said first and said second shaft means said spindle unit is caused to move transversely of said housing means relative to said central axis, and means for selectively moving said spindle unit in directions parallel to said central axis.

2. The combination recited in claim 1 wherein said housing means and said orbitally adapted mounting means comprise means defining therein cooperative orthogonally arranged guidance grooves and ball bearing guidance elements constrained in said grooves.

3. A machine tool, comprising, housing means defining a longitudinal central axis, a motorized tool spindle unit including tool holding means defining a tool axis and electric motor means for driving the tool holding means so as to perform the cutting or other tool function of the machine, means including a spindle unit carrier mounting said spindle unit on said housing means for generally parallel orientation between said tool axis and said central axis and for unitary movement of said spindle unit in and said carrier transverse planes of said housing means to any of a variety of selectable positions of said tool axis parallely spaced with respect to said central axis, said housing means and said mounting means including means defining therein cooperative orthogonally arranged guidance grooves receiving ball bearings whereby said spindle unit is adapted to orbital movement about said central axis, a first drive tube rotatably mounted on said housing means with its axis aligned on said central axis, first variable speed electric motor means for rotating said first tube on said central axis, a second rotatable drive tube nested concentrically with said first tube, second variable speed electric motor means for rotating said second tube on said central axis in controlled relationship with rotation of said first tube, means connecting one of said tubes with carrier unit for unitary rotation with respect to said housing means, an eccentric cam on the other of said tubes and a complementary cam follower on said carrier inter-engaged so that upon relative rotation between said first and said second tubes said spindle unit is caused to move transversely of said housing means relative to said central axis, and means for selectively moving said spindle unit in directions parallel to said central axis.

* * * * *